(12) United States Patent
Kirby et al.

(10) Patent No.: US 10,784,928 B2
(45) Date of Patent: *Sep. 22, 2020

(54) ROTARY DATA COUPLER

(71) Applicant: UATC, LLC, San Francisco, CA (US)

(72) Inventors: Brian Thomas Kirby, Pittsburgh, PA (US); Scott K. Boehmke, Wexford, PA (US); Yoonki Peter Park, Pittsburgh, PA (US); James A. Gasbarro, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/669,180

(22) Filed: Oct. 30, 2019

(65) Prior Publication Data

US 2020/0106485 A1  Apr. 2, 2020

Related U.S. Application Data

(63) Continuation of application No. 16/186,056, filed on Nov. 9, 2018, now Pat. No. 10,498,403, which is a
(Continued)

(51) Int. Cl.
*H04B 1/00* (2006.01)
*H04L 5/16* (2006.01)
(Continued)

(52) U.S. Cl.
CPC ......... *H04B 5/0075* (2013.01); *H04B 5/0012* (2013.01); *H04L 25/0266* (2013.01);
(Continued)

(58) Field of Classification Search
CPC .... H04B 5/0075; H04B 1/005; H04B 1/0053; H04B 1/3822; H04L 5/16
See application file for complete search history.

(56) References Cited

U.S. PATENT DOCUMENTS 9,628,170 B1  4/2017  Rosenband et al.
10,177,820 B1  1/2019  Kirby et al.
(Continued)

FOREIGN PATENT DOCUMENTS

EP  3016337 A1  5/2016
EP  3016337 A1  5/2016
(Continued)

OTHER PUBLICATIONS

"U.S. Appl. No. 16/186,056, Non Final Office Action dated Mar. 4, 2019", 10 pgs.
(Continued)

*Primary Examiner* — Andrew Wendell
(74) *Attorney, Agent, or Firm* — Dority & Manning, P.A.

(57) ABSTRACT

Various examples are directed to a rotary coupler and methods of use thereof. The rotary data coupler may comprise a transmitter and receiver. The transmitter may comprise a first band and a second transmitter band. The receiver may comprise a receiver housing positioned to rotate relative to the first transmitter band and the second transmitter band. A first receiver band may be positioned opposite the first transmitter band to form a first capacitor and a second receiver band may be positioned opposite the second transmitter band to form a second capacitor. The receiver may also comprise a resistance electrically coupled between the first receiver band and the second receiver band and a differential amplifier. The differential amplifier may comprise an inverting input and a non-inverting input, with the non-inverting input electrically coupled to the first receiver band and the inverting input electrically coupled to the second receiver band.

20 Claims, 5 Drawing Sheets

Related U.S. Application Data continuation of application No. 15/816,700, filed on Nov. 17, 2017, now Pat. No. 10,177,820.

(51) Int. Cl.
  *H04B 5/00* (2006.01)
  *H04L 25/02* (2006.01)
  *H04L 25/49* (2006.01)

(52) U.S. Cl.
  CPC ...... *H04L 25/0272* (2013.01); *H04L 25/0298* (2013.01); *H04L 25/4908* (2013.01)

(56) References Cited

U.S. PATENT DOCUMENTS

| | | | |
|---|---|---|---|
| 10,498,403 B2* | 12/2019 | Kirby | H04L 25/0266 |
| 2003/0080898 A1 | 5/2003 | Wang et al. | |
| 2011/0122017 A1 | 5/2011 | Vacanti | |
| 2012/0094620 A1 | 4/2012 | Lu et al. | |
| 2012/0235882 A1 | 9/2012 | Iverson et al. | |
| 2013/0324058 A1 | 12/2013 | Yoon et al. | |
| 2015/0011159 A1 | 1/2015 | Marinov et al. | |
| 2015/0091374 A1 | 4/2015 | Lenius et al. | |
| 2016/0013923 A1 | 1/2016 | Malaga et al. | |
| 2019/0158150 A1 | 5/2019 | Kirby et al. | |

FOREIGN PATENT DOCUMENTS

| | | |
|---|---|---|
| JP | 2002140801 A | 5/2002 |
| JP | 2002140801 A | 5/2002 |
| WO | 2019099853 A1 | 5/2019 |
| WO | WO-2019099853 A1 | 5/2019 |

OTHER PUBLICATIONS

"U.S. Appl. No. 16/186,056, Notice of Allowance dated Jul. 9, 2019", 7 pgs.

"U.S. Appl. No. 16/186,056, Response filed Jun. 4, 2019 to Non Final Office Action dated Mar. 4, 2019", 10 pgs.

Roberts, Gwyn, et al., "A Contactless Transfer Devicce for Power and Data", IEEE, (1996), 333-345.

"International Application Serial No. PCT/US2018/061553, International Search Report dated Feb. 18, 2019", 4 pgs.

"International Application Serial No. PCT/US2018/061553, Written Opinion dated Feb. 18, 2019", 8 pgs.

Roberts, G. et al., "A Contactless Transfer Device for Power and Data", IEEE, 1996, pp. 333-345.

"Slip Ring Solutions", Schleifring, [Online]. Retrieved from the Internet: <URL: https://www.schleifring.de/wp-content/uploads/2016/11/SCHLEIFRING_Technology.pdf>, (Nov. 1, 2016), 2 pgs.

"U.S. Appl. No. 15/816,700, Notice of Allowance dated Aug. 8, 2018", 10 pgs.

"U.S. Appl. No. 15/816,700, 312 Amendment filed Nov. 8, 2018", 7 pgs.

"U.S. Appl. No. 15/816,700, PTO Response to Rule 312 Communication dated Dec. 10, 2018", 2 pgs.

* cited by examiner

ROTARY DATA COUPLER

CLAIM FOR PRIORITY

This application is a continuation of and claims the benefit of priority to U.S. application Ser. No. 16/186,056, filed Nov. 9, 2018, which is a continuation of and claims the benefit of priority of U.S. application Ser. No. 15/816,700, filed Nov. 17, 2017, the disclosures of each of which are incorporated herein by reference in their entireties.

FIELD OF THE DISCLOSURE

This document pertains generally, but not by way of limitation, to rotary data couplers and methods of using the same.

BACKGROUND

In many applications, it is desirable to transmit an electrical signal across a rotating interface. Various types of rotary data couplers can be used. A slip-ring rotary data coupler includes a ring that is in physical contact with a brush. As the ring rotates relative to the brush, current is conducted at the physical interface between the components. In an inductive rotary data coupler, a transmitter component generates a magnetic field from an electrical signal. The magnetic field induces a current indicative of the transmitted electrical signal in a receiver component.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
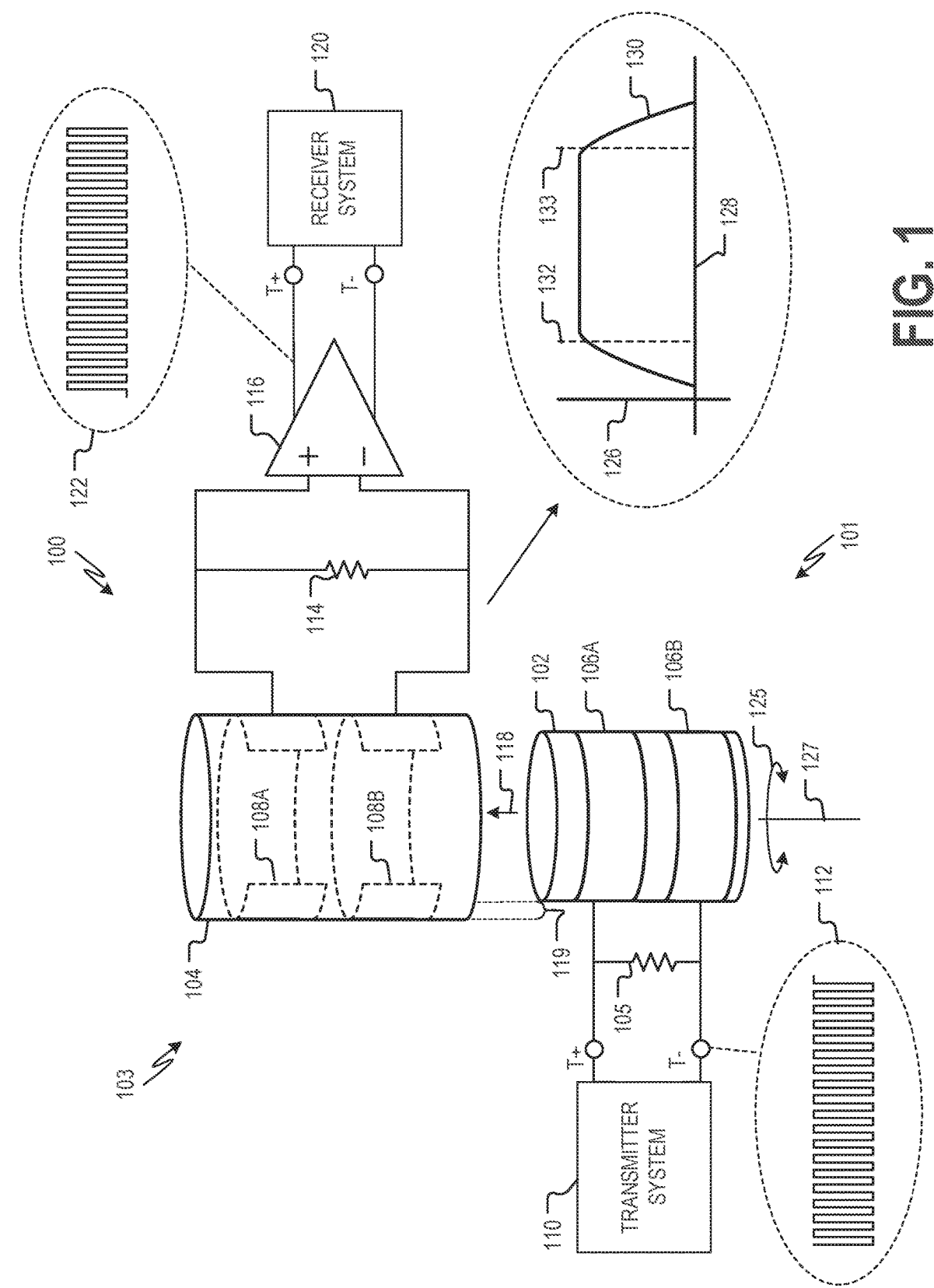
FIG. 1 is diagram showing one example of a rotary data coupler and components for use therewith.

Various examples are directed to rotary data couplers that may be used, for example, to transmit an electrical signal across a rotating interface. A rotating interface includes components that partially or fully rotate relative to one another. Rotating interfaces occur in many different types of electrical and/or electromechanical devices including, for example, systems with rotatable sensors or sensor arrays, such as Radio Detection and Ranging (RADAR), Light Detection and Ranging (LIDAR), vehicles with wheels, such as cars, trucks, trains, etc.

Rotary data couplers are used in various applications where it is desirable to transmit an electrical signal across a rotating interface. For example, a rotating LIDAR system generates an electrical signal indicating sensed data. A rotary data coupler, such as the rotary data couplers described herein, may be used to transmit the electrical signal from the rotating LIDAR system to another component that does not rotate with the LIDAR system, such as a control circuit for the LIDAR, another system component, etc. In another example, a sensor or other electrical component may be positioned on a wheel, hub, or other rotating piece a vehicle. The sensor may generate data that is to be transmitted to a control circuit or other system of the vehicle while the wheel or hub is rotating. A rotary data coupler, such as the rotary data couplers described herein, may be used to transmit the data from the sensor to the control circuit or other system.

An example rotary data coupler utilizes capacitive coupling to transmit an electrical signal (a transmitted signal) across a rotating interface from a transmitter to a receiver. For example, the electrical signal is provided at one or more transmitter bands. As charge accumulates at the one or more transmitter bands, an electric field is generated. The electric field brings about a corresponding charge at one or more receiver bands. In some examples, the transmitter comprises first and second transmitter bands and the receiver comprises first and second receiver bands. The transmitter and receiver are arranged to align the respective transmitter and receiver bands. For example, the first transmitter band may be aligned with the first receiver band to form a first capacitor. The second transmitter band is aligned with the second receiver band to form a second capacitor. When aligned, the respective transmitter and receiver bands are rotatable relative to one another. The first and second capacitors couple a signal and a reference value for the transmitted signal, which is received at the receiver as a received signal.

Alignment of the various transmitter and receiver bands is accomplished in any suitable manner. For example, the first and second transmitter bands may be wrapped at least partially around a circumference of a transmitter cylinder that is configured to fit within a receiver cavity of a receiver housing. The first and second receiver bands are positioned around a cavity wall of the receiver housing. The transmitter cylinder is received at least partially within the receiver cavity to align the respective transmitter and receiver bands. The transmitter cylinder is rotatable within the receiver cavity about an axis of rotation. When the transmit signal is provided across the transmitter bands. The first and second capacitors conduct the transmit signal across the rotating interface, with the received signal appearing across the receiver bands.

Capacitive rotary data couplers, as described herein, may provide various advantages over other types of rotary data couplers. For example, because the electrical signal is passed via an electric field, the transmitter and receiver may be arranged such that the transmitter and receiver bands do not come into physical contact with one another. This reduces mechanical wear on the coupler. Also, some capacitive rotary data couplers are capable of handling alternating current (A/C) signals at higher frequencies than can be handled by inductive couplers of comparable size.

The rotary data couplers described herein may be configured with a suitable frequency response. The frequency response of a rotary data coupler describes the frequency content of the electrical signal that is passed and/or attenuated. For example, the rotary data coupler is described by a passband indicating a band or range of frequencies that are transmitted across the first and second capacitors. The passband of the rotary data coupler is described by cutoff frequencies. A low cutoff frequency describes the low frequency range of the passband and a high cutoff frequency describes the high frequency range of the passband. In some examples, the low and high cutoff frequencies are considered to be the frequencies at which the transmitted signal is attenuated by 3 dB or to about half-power. Frequency content lower than the low cutoff frequency is attenuated at more than about 3 dB while frequency content higher than the low cutoff frequency is attenuated at less than about 3 dB. The low cutoff frequency of the rotary data coupler may be described by Equation [1] below:

$$f_{co} = \frac{1}{2\pi RC} \quad [1]$$

In Equation [1], $f_{co}$ is the low cut-off frequency of the rotary data coupler. R is the resistance of the rotary data coupler, and C is the capacitance of the rotary data coupler (e.g., based on the capacitance of the first and second capacitors).

The rotary data coupler is configured with a passband that is positioned avoid attenuating data represented in the transmitted signal. The transmitted signal is a digital signal that represents data as a series of one or more discrete bits. The value of a bit may be represented by a level of current and/or voltage in the transmitted signal. For example, a first level of voltage and/or current may represent logical one while a second level of voltage and/or current may represent logical zero. A data rate of the transmitted signal indicates the number of bits represented by the transmitted signal per unit time. The analog frequency content of the transmitted signal is based on the number of transitions between logical one and logical zero per unit time. The rotary data coupler may be configured such transitions in the transmit signal are within the passband of the rotary data coupler.

In some examples, the transmitted signal is encoded according to an encoding scheme that maintains a minimum number of transitions per unit time. Such an encoding scheme is used to keep the analog frequency of the transmitted signal above a minimum threshold. For example, if the transmitted signal has an extended sequence where it does not transition between logical one and logical zero, the analog frequency drops. If the analog frequency drops below the low cut-off frequency of the rotary data coupler, the transmitted signal is attenuated, causing distortion. On example encoding scheme that maintains a minimum number of transitions per unit time is 8b/10b encoding. 8b/10b encoding represents each eight bit word of the transmitted signal as a corresponding ten bit symbol, but also guarantees a transition between logical one and logical zero at least once every five bits. Accordingly, the minimum number of transitions per unit time is the data rate divided by five. Accordingly, when 8b/10b encoding is used, the lowest frequency content of data represented by the transmitted signal (e.g., indicated in Hz) is about one tenth of the data rate (e.g., indicated in bits per second).

Configuring the rotary data coupler with a passband that avoids attenuating data in the transmitted signal may include setting a low cut-off frequency of the rotary data coupler high enough to avoid significantly attenuating the lowest frequency content of the data. In some examples, this includes setting the low cut-off frequency lower than about one half of the expected lowest frequency content of the transmitted. Referring to Equation [1] above, this may be accomplished by selecting the resistance and/or capacitance of the coupler to achieve the desired low cutoff frequency.

In practice, however, it may be challenging to select a high enough capacitance to achieve a desired low cutoff frequency. Capacitance of a capacitor is given by Equation [2] below:

$$C = \frac{\epsilon A}{d} \quad [2]$$

In Equation [2], C is capacitance, $\epsilon$ is the absolute dielectric constant of the material between the capacitor elements (in this example, between respective transmit and receive bands), A is the surface area of the capacitor elements, and d is the distance between the capacitor elements. As shown, capacitance can be increased by increasing the absolute dielectric constant, increasing the area of the hands, or decreasing the distance between the bands. Increasing the absolute dielectric constant significantly may be difficult. Also, the area of the bands may be limited by the size of the rotary data coupler. For example, increasing capacitance by an order of magnitude or more would involve significantly increasing the size of the rotary data coupler. Further, significant decreases in the distance between receiver and transmitter bands may lead to reduced mechanical tolerances, which may require increased manufacturing expenses and lead to mechanical wear if the bands rub against each other.

In many implementations that utilize 8b/10b or similar encoding, such as Peripheral Component Interconnect Express (PCIe) or Serial Gigabit Media. Independent Interface (SGMH), the transmitter and receiver are optimized for 100 ohm differential transmission lines and terminations. For example, referring to Equation [1] above, a typical value for R would be about 100 ohms differentially or 50 ohms if analyzing one side of the transmission individually. With this differential resistance, constructing a physical hand structure that also meets the electrical and passband requirements can be challenging. For example, with the resistance at or near 100 ohms, the capacitance to meet the desired cut-off frequency would lead to bands with very large areas or very small gaps between bands, which would lead to tight tolerances.

Instead of, or in addition to, increasing capacitance, various rotary data couplers described herein introduce a receiver resistance electrically coupled between the first and second receiver bands. Referring to Equation [1] above, a receiver resistance may be selected with a high enough value to give the rotary data coupler a low cut-off frequency that does not attenuate the expected lowest frequency of the transmitted signal. Increasing the receiver resistance lowers the current at the receiver. Accordingly, to aid in the detection of the receiver signal, a differential amplifier may be electrically coupled between the first and second receiver bands. The differential amplifier amplifies a difference between current and/or voltage at the first and second receiver bands, providing the received signal at one or more outputs of the differential amplifier.

Rotary data couplers, as described herein, may have a passband that encompasses transitions in the transmit signal (e.g., logical one to logical zero or logical zero to logical one). In some examples, this may allow the rotary data couplers described herein with common transceiver hardware and software (e.g., PCIe or SGMII transceivers) without resorting to more complex means of increasing transmit signal frequency, such as Manchester encoding or a similar encoding.

FIG. 1 is diagram showing one example of a rotary data coupler 100 and components for use therewith. The rotary data coupler 100 includes a transmitter 101 and a receiver 103. The transmitter 101 includes a transmitter system 110 that generates a transmit signal 112. The transmit signal 112 may be a digital, differential signal manifested between a positive transmit output T+ and a negative transmit output T−. The transmitter system 110 comprises any suitable system that generates a transmit signal 112 to be coupled across a rotating interface. One example transmitter system 110 is a rotating transceiver of a LIDAR system that rotates to sense some or all of a panoramic field-of-view.

In the example of FIG. 1, the transmit signal 112 is provided at T+ and T−. A transmitter termination resistance 105 is provided between T+ and T−. The transmit signal is provided to transmitter bands 106A, 106B. In the example of FIG. 1, the transmitter bands 106A, 106B are at least partially wrapped around a transmitter cylinder 102. Although the transmitter bands 106A, 106B are shown wrapped all the way around a circumference of the transmitter cylinder 102, in some examples, the transmitter bands 106A, 106B do not extend around an entire circumference of the transmitter cylinder 102.

The transmitter cylinder 102 is configured to fit within a receiver cavity 118 of a receiver housing 104. Receiver bands 108A, 108B are positioned on an interior wall of the receiver cavity 118, for example, at least partially around a circumference of an inside surface of the receiver cavity 118. In some examples, the receiver bands 108A, 108B are positioned at least partially around an outer circumference of the receiver cavity 118. In examples in which the receiver bands 108A, 108B are positioned at least partially around an outer circumference of the receiver cavity 118, some or all of the material making up the receiver housing 104 is between the respective receiver bands 108A, 108B and transmitter bands 106A, 106B.

The transmitter bands 106A, 106B and the receiver bands 108A, 108B are positioned such that the respective bands 106A, 108A and 106B, 108B align when the transmitter cylinder 102 is received within the receiver housing 104. Transmitter band 106A and receiver band 108A form a first capacitor while transmitter band 106B and receiver band 108B form a second capacitor. The bands 106A, 108A, 106B, 108B may comprise any suitable conductive material such as, for example, copper. In other examples, the transmitter and receiver may be reversed, such that a receiver cylinder may fit within a transmitter cavity.

The transmitter cylinder 102 and the receiver housing 104 are rotatable relative to each other about an axis 127 of rotation. Rotation may be in either direction or both directions indicated by arrow 125. In some examples, the receiver housing 104 is stationary while the transmitter cylinder 102 rotates about the axis 127. In alternative examples, the transmitter cylinder 102 is stationary while the receiver housing 104 rotates about the axis 127. In further examples, both the transmitter cylinder 102 and the receiver housing 104 rotate about the axis 127. A gap 119 between the bands 106A, 108A, 106B, 108B may be at least about 25 microns. The gap 119 may be between about 25 microns and about one millimeter. In some examples, the gap 119 is at least about 1 millimeter such as, for example, two or more millimeters. The gap 119 may be between the transmitter cylinder 102 and the receiver cavity 118 of the receiver housing 104.

In addition to the receiver housing 104 and the receiver bands 108A, 108B, the receiver 103 may include a receiver resistance 114, a differential amplifier 116, and a receiver system 120. The receiver resistance 114 is electrically coupled between the first receiver band 108A and the second receiver band 108B.

The transmitted signal 112 may be of a high enough frequency that transmission line effects are relevant to the behavior of the circuit. For example, the transmitter system 110 has a characteristic impedance. The transmitter termination resistance 105 may be selected to match the characteristic impedance of the transmitter system 110, thus terminating a differential transmission line between the transmitter system 110 and the transmitter bands 106A, 106B. In various examples, other transmission line termination techniques may be used in addition to or instead of the transmitter termination resistance 105. In some examples, the transmitter system 110 has a characteristic impedance of about 50Ω single ended or a differential impedance of about 100Ω. In some examples, the transmitter termination resistance 105 is selected to match a combined characteristic impedance of the transmitter system 110 and one or more connections or other components between the transmitter system 110 and the transmitter bands 106A, 106B.

The transmitted signal 112 may appear across the transmitter resistance 105. Capacitors formed by the transmitter bands (e.g., a first capacitor including bands 106A, 108A and a second capacitor including bands 106B, 108B) may also conduct the transmitted signal 112 where it also appears across the receiver resistance 114. The receiver resistance 114 is selected to generate a low cut-off frequency that is low enough to avoid excessive attenuation of the low-frequency components of the transmitted signal 112.

The size of the receiver resistance 114 is selected to achieve a suitable low cut-off frequency for the rotary data coupler 100. In examples where the capacitance of the first and second capacitors is about 1 pf or less, the receiver resistance may be between about 1 kΩ and about 100 kΩ. In some examples, the receiver resistance may be between about 50 kΩ and 44 kΩ. The receiver resistance 114 may be higher, in some examples two or more orders of magnitude higher, than the characteristic resistance of the combined transmitter system 110, bands 106A, 106B, 108A, 108B and other connections or components without causing significant distortion due to signal reflection back towards the transmitter system 110. For example, the terminating resistance 105 or other suitable transmission line termination mechanism, terminates the differential transmission line made up of the transmitter system 110 and other connections or components between the transmitter system 110 and the transmitter bands 106A, 106B. This reduces or eliminates reflection of the transmitted signal 112 back towards the transmitter system 110. The bands 106A, 106B, 108A, 108B, and receiver resistance 114, then, are positioned in parallel to the differential transmission line. In this way, a relatively high receiver resistance 114 may be selected without deleterious transmission line effects causing excessive reflection of the transmitted signal 112.

When the receiver resistance 114 is high enough to bring about the desired low cut-off frequency, it reduces the current in the receiver 103. For example, if transmitted signal is between positive and negative 1.2 volts, then the absolute value of the current at the receiver resistance 114 is a few hundred microamps or less. The differential amplifier 116 is used to redrive the current and/or voltage across the receiver bands 108A, 108B. The differential amplifier 116 has an inverting input (indicated by "−") and a non-inverting input (indicated by "+"). The non-inverting input is electrically coupled to the receiver band 108A and the inverting input is coupled to the receiver band 108B. In some examples, the differential amplifier 116 is selected with high input impedance such that the current sourced and/or sunk by the differential amplifier 116 is small. A received signal 122 is provided at outputs of the differential amplifier 116, shown as R+ and R−.

When the transmitted signal 112 is a digital signal, the received signal 122 is also a digital signal. The received signal 122 is provided to a receiver system 120. The receiver system 120 may be, or include, any suitable system that receives a signal from the transmitter system 110, In examples where the transmitter system 110 is a LIDAR system, the received signal 122 indicates an output of the LIDAR system. The receiver system 120 may be, or include, a processing system for processing the output of the LIDAR system such as, for example, formatting the output, utilizing the output in a control system, etc.

FIG. 1 also shows a frequency response 130 for the rotary data coupler 100. The horizontal axis 128 indicates frequency while the vertical axis 126 indicates gain. A low cut-off frequency 132 is also shown. The desired maximum low cut-off frequency may be determined, for example, based on the nature of the transmitted signal 112. For example, if the transmitted signal 112 is encoded by an encoding scheme that sets a minimum number of transitions per unit time, the lowest frequency content of the transmitted signal 112 is the minimum number of transitions per unit time set by the encoding scheme (e.g., the minimum transition frequency). For example, if the 8b/10b encoding scheme is used, the lowest frequency content of the signal is about equal to the data rate divided by five. Accordingly when 8b/10b encoding is used, the low cut-off frequency 132 may be selected to be about one tenth of the data rate of the transmit signal. For example, if the transmit signal is 2.5 Gb/s, the low cut-off frequency 132 may be about 250 MHz. In some examples, the low cut-off frequency 132 is selected to be about one tenth of the data rate of the transmit signal, which is about one half of one twentieth of the lowest frequency content.

Recalling that the low cut-off frequency is the frequency at which the transmitted signal 112 is attenuated at 3 dB, or to half power, in some examples, the low cut-off frequency is lower than the lowest frequency content of the transmitted signal 112 to incorporate a safety margin. In some examples where the transmitted signal 112 is encoded utilizing 8b/10b encoding, with a minimum transition frequency at one tenth the data rate, the low cut-off frequency is set lower than one tenth the data rate, such as, for example, between about one tenth and about one twentieth of the data rate. The rotary data coupler 100 may also have a high cut-off frequency 133 indicating the highest frequency content that is passed (e.g., not attenuated). Frequency content above the high cut-off frequency 133, such as high frequency noise, is attenuated. The rotary data coupler 100 may be configured with a high cut-off frequency that is at least higher than the data rate. In some examples, the rotary data coupler 100 is configured with a high cut-off frequency that is several multiples of the data rate so as to avoid attenuating higher order harmonics. For example, the high cut-off frequency 133 may be about 2 GHz for a signal conforming to the PCIe Generation 1 standards.

In the arrangement of FIG. 1, the low cut-off frequency 132 is given by Equation [1] above, with the capacitances of the first capacitor (bands 108A, 106A) and second capacitor (bands 108B, 106B) forming the capacitance indicated by "C" and the resistance of the receiver resistance 114 forming the resistance indicated by "R." In various examples, the combined capacitance of the first and second capacitors is small, for example, between about 0.03 pF and about 10 pF. In some examples, the combined capacitance of the first and second capacitors is between about 0.03 pF and 0.3 pF. The value of the receiver resistance 114 may be selected to generate a low cut-off frequency 132 as described herein. In one example where the capacitance of the first and second capacitors is about 0.3 pF, the value of the resistance 114 may be about 44 kΩ.

Figure 2:
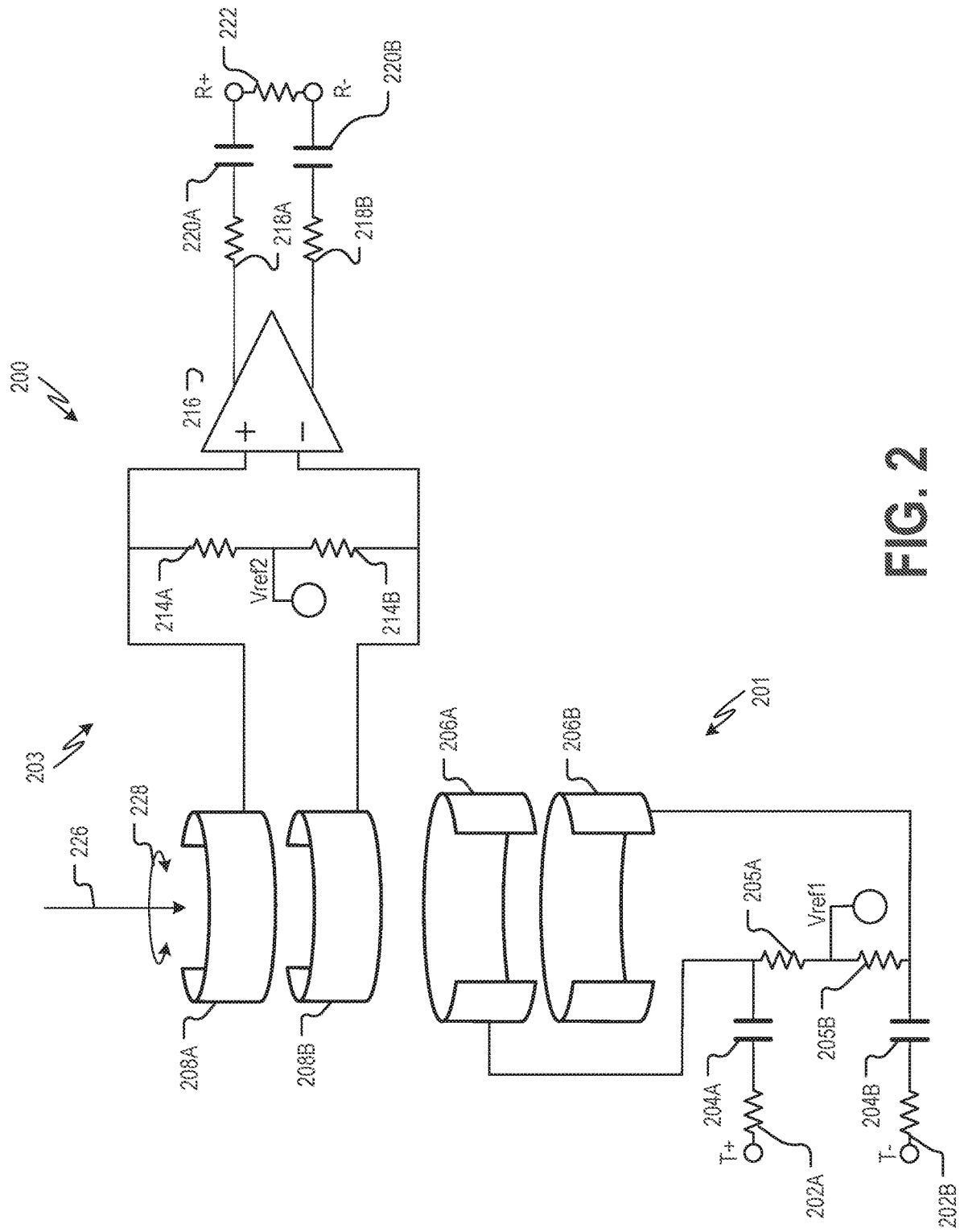
FIG. 2 is a diagram showing another example of a rotary data coupler and components for use therewith.

FIG. 2 is a diagram showing another example of a rotary data coupler 200 including a transmitter 201 and a receiver 203. In the example of FIG. 2, receiver bands 208A, 208B fit inside of transmitter bands 206A, 206B. For example, the receiver bands 208A, 208B may be wrapped around a circumference of a receiver cylinder that fits within a transmitter cavity of a transmitter housing. The transmitter bands 206A, 206B and the receiver bands 208A, 208B may rotate relative to one another about an axis 226 as indicated by arrow 228, for example, similar to what is described with respect to FIG. 1. In other examples the orientation may be reversed such that a transmitter cylinder fits within a receiver cavity of a receiver housing.

In the example of FIG. 2, the transmit signal, indicated by T+ and T− is provided to coupling resistors 202A, 202B and coupling capacitors 204A, 204B. A transmitter termination resistance including resistors 205A, 205B is also shown, with a reference voltage Vref1 provided there between. For example, each resistor 205A, 205B may be about half of the total transmitter termination resistance.

At the receiver 203, receiver resistance includes two resistors 214A, 214B that are also provided with a reference voltage Vref2. The reference voltage may be ground, or any suitable reference. The output of a differential receiver 216 is provided to coupling resistors 218A, 218B and coupling capacitors 220A, 220B. The received signal, indicated by R+ and R−, may be across a termination resistor 222.

The differential receiver resistance is a sum of the resistances of the resistors 214A, 214B. For example, the sum of the resistances of the resistors 214A, 214B may be between about 1 kΩ and about 100 kΩ. In some examples, the receiver resistance may be between about 500Ω and 44 kΩ. In the arrangement of FIG. 2, the frequency response of the rotating data coupler is based on the first capacitor (bands 208A, 208A), the second capacitor (bands 208B, 208B), and resistors 202A, 202B, 214A, 214B. This decouples the frequency response of the rotary coupler 100 from the differential impedance of common to 8b/10b signals, which allows for capacitors to be constructed with lower area, increased gaps or separation distance, and less focus on dielectric materials.

Figure 3:
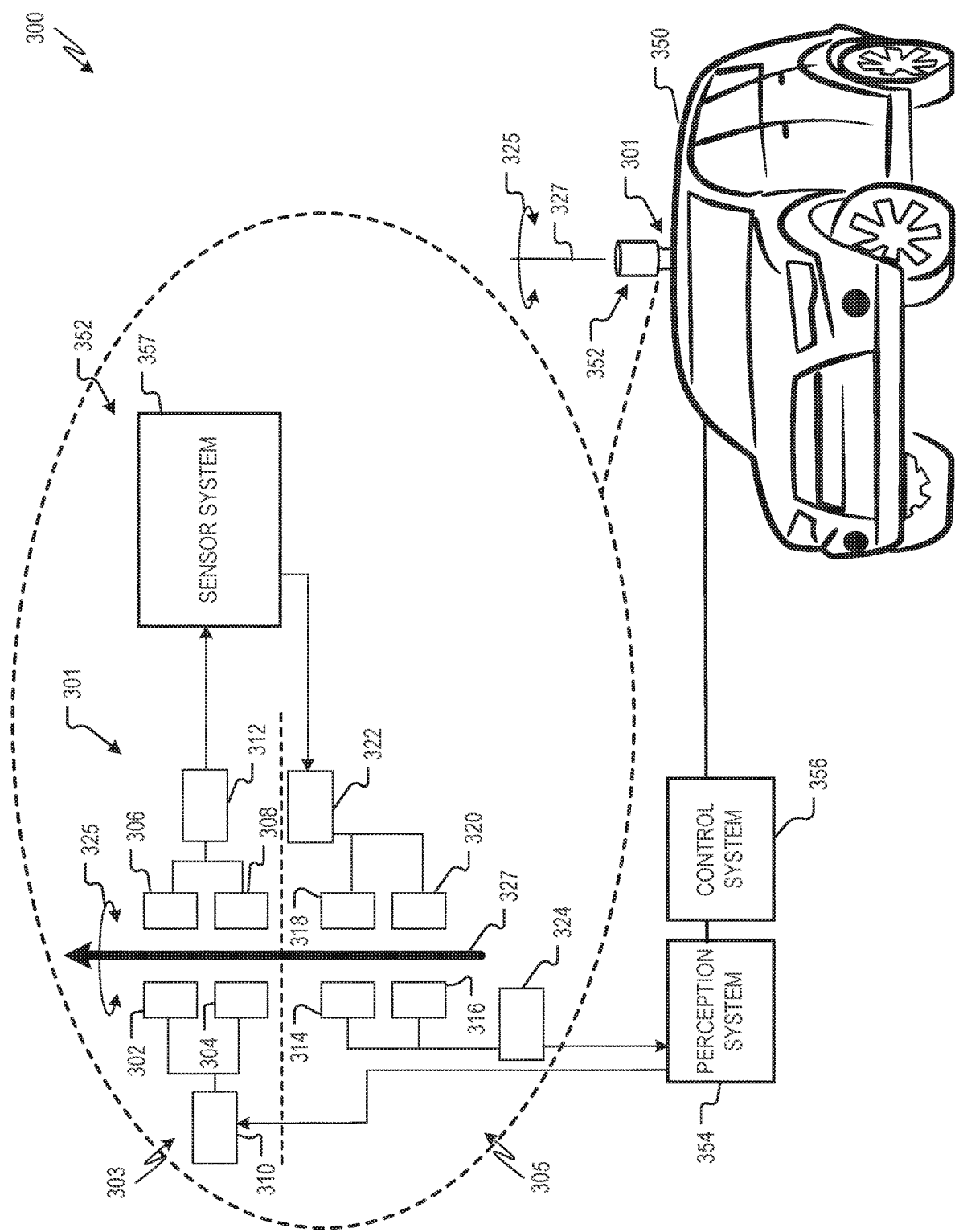
FIG. 3 is a diagram showing one example environment for utilizing a rotary data coupler.

FIG. 3 is a diagram showing one example environment 300 for utilizing a rotary data coupler 301. The environment 300 includes a vehicle 350 with a rotating sensor housing 352. The vehicle 350, in some examples, is autonomous or semi-autonomous. The sensor housing 352 rotates relative to the vehicle 350 about the rotary data coupler 301. For example, the sensor housing 352 rotates about an axis of rotation 327 in one or more of the directions indicated by arrows 325. The sensor housing 352 comprises a sensor system 357 comprising one or more sensors such as, for example, LIDAR system sensors, RADAR system sensors, one or more cameras, etc. (e.g., visible spectrum cameras, infrared cameras, etc.), and/or other sensors.

In some examples, the sensor system 357 includes one or more active sensors such as LIDAR sensors or RADAR sensors. A LIDAR sensor, for example, includes one or more lasers or other sources of visible or invisible light that are directed into the environment 300 around the vehicle 350. Reflections of the light are detected by one or more photodiodes or other sensors. In a RADAR system, one or more antennas transmit electromagnetic waves (e.g., radio frequency radiation) into the environment 300 around the vehicle 350. Reflections of the electromagnetic waves are sensed by one or more receive antennas. In some examples, a RADAR transmitter and receiver use a common antenna.

Outputs of the sensor system 357 are provided to a perception system 354 (e.g., via the rotary data coupler 301). The perception system 354 is programmed to determine a location of the vehicle 350 and/or information describing the environment 300 around the vehicle 350. For example, sensor data provided to the perception system 354 by one or more sensors at the sensor housing, and/or other sensors, can include information that describes the location of objects within the surrounding environment 300 of the vehicle 350.

As one example, sensor data received from a LIDAR system includes the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light. As another example, sensor data received from a RADAR system may include the location (e.g., in three-dimensional space relative to the RADAR system) of a number of points that correspond to objects that have reflected a ranging electromagnetic wave. Electromagnetic waves (e.g., pulsed or continuous) transmitted by the RADAR system can reflect off an object and return to a receiver of the RADAR system, giving information about the object's location and speed. Thus, a RADAR system can provide useful information about the current speed of an object.

The perception system 354 receives sensor data from one or more sensors (including, for example, one or more sensors at the rotating sensor housing 352) and derives information about the environment 300 surrounding the vehicle 350 including, for example, a position of the vehicle 350 in the environment 300. Information derived by the perception system 354 is provided to a control system 356. The control system 356 controls one or more functions of the car based on the information derived by the perception system 354 including, for example, throttle, braking, steering, etc. For clarity, the blocks representing the perception system 354 and control system 356 are displayed outside of the vehicle 350. These systems 354, 356 may be positioned within the vehicle 350, mounted to an exterior of the vehicle, remote from the vehicle 350, etc.

The example data coupler 301 shown in FIG. 3 is bidirectional. A first channel 303 is for transmitting data from the perception system 354 (or other system at the vehicle 350) to the sensor system 357. A second channel 305 is for transmitting data from the sensor system 357 to the perception system 354 (or other system at the vehicle 350). The first channel includes transmit bands 302, 304 that may be positioned to rotate about the axis of rotation 327, for example, similar to transmit bands 106A, 106B, 208A, 208B described herein. A transmitter termination resistance 310 may be present to terminate a transmission line between the perception system 354 (or other system at the vehicle 350) and the transmit bands 302, 304. Receive bands 306, 308 may form capacitors with the respective transmit bands 302, 304, as described herein. A receiver circuit 312 includes a receiver resistance and differential amplifier, as described herein with respect to FIGS. 1 and 2.

In some examples, the channels 303, 305 utilize common housings. For example, transmitter bands 302, 304 and receiver bands 314, 316 may be positioned on a first housing. For example, the bands 302, 304, 314, 316 may be positioned on an interior wall of a cavity, such as the bands 108A, 108B are positioned on an interior wall of the receiver cavity 118 in FIG. 1. Similarly, transmitter bands 318, 320 and receiver bands 306, 308 may be positioned on a second housing. For example, bands 306, 308, 318, 320 may be wrapped around a cylinder, such as bands 106A, 106B are wrapped around the transmitter cylinder 102 in FIG. 1. The first and second housings may align corresponding transmitter and receiver bands and may be rotatable relative to one another.

The second channel 305 may include transmit bands 318, 320 and receive bands 314, 316 similar to transmit bands 302, 304 and receive bands 306, 308. The second channel 305 may also include a transmitter termination resistance 322 and a receiver circuit 324 including a receiver resistance and differential amplifier, as described herein. In some examples, bands 302, 304, 314, 316 are mounted on a first common housing while bands 306, 308, 318, 320 are mounted on a second common housing.

In some examples, the rotary data coupler 301 is unidirectional, for example, with data being transmitted from the sensor system 357 to the perception system 354 only. Accordingly, the channel 303 may be omitted. Also, in other examples, bi-directional rotary data couplers, such as 301, may be used in various other environments. Also, some rotary data couplers may include multiple channels oriented in the same direction (e.g., to provide communications from the same transmitter system to the same receiver system) example, a single transmitter system may utilize multiple channels to utilize multiple communication lands to the receiver system.

The rotating data couplers described herein may be advantageous in rotating sensor housings for use with vehicles, such as the rotating sensor housing 352 and the vehicle 350 of the environment 300. It may be desirable for a rotating sensor housing 352 to be small enough to avoid protruding beyond the roof of the vehicle 350. For example, the rotating sensor housing 352 may be less than about 5 feet in diameter, less than about 4 feet in diameter, less than about 3 feet in diameter, etc. Also, in some examples, it may be desirable to minimize the mass of the rotating sensor housing 352. The diameter of the rotating sensor housing 352, in some examples is less than about 12 inches, less than about 6 inches, less than about 4 inches, etc.

Also, in the environment 300 including a vehicle 350, which may be a self-driving vehicle, the rotating sensor housing 352 may house a LIDAR and/or other sensor system that generates data at a high rate, such as, for example, between about 0.5 Gb/s and about 2.5 Gb/s. As described here, it may be desirable for the low cut-off frequency of the rotary data coupler 301 to be between about one tenth of the data rate (e.g., between about 50 MHz and about 250 MHz) and about one twentieth of the data rate (e.g., between about 25 MHz and 125 MHz). In this environment 300, the capacitive rotary data coupler 301, as described herein, may be well suited to achieve the described frequency response while also meeting the described size constraints.

Figure 4:
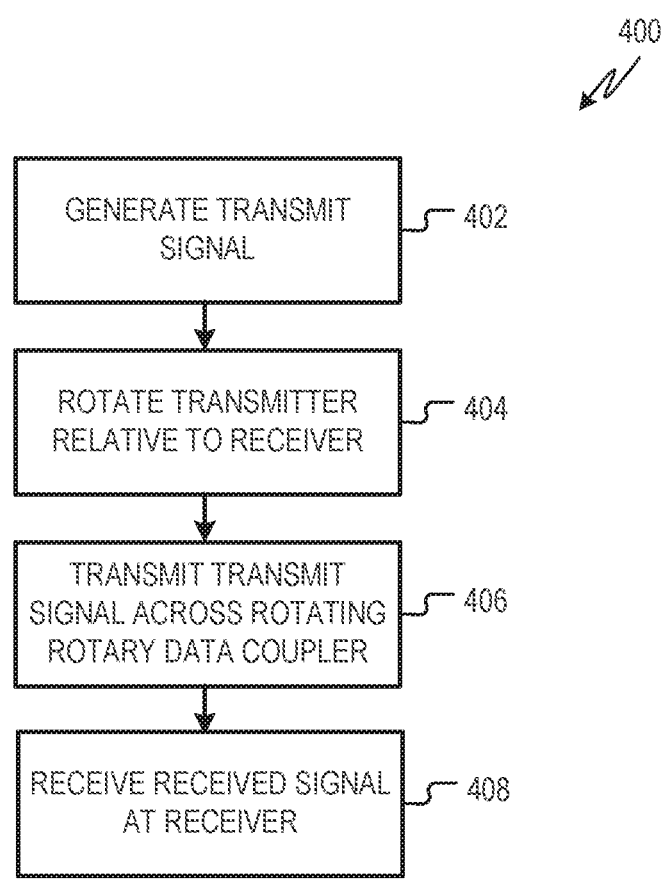
FIG. 4 is a flowchart showing one example of a process flow that may be executed, for example, utilizing a rotary data coupler, such as the rotary data couplers shown in FIGS. 1-3.

FIG. 4 is a flowchart showing one example of a process flow 400 that may be executed, for example, utilizing a rotary data coupler, such as the rotary data couplers 100, 200, 301 described herein. At operation 402, a transmitter system, such as transmitter system 110, generates a transmit signal, such as the transmit signal 112. In some examples, the transmit signal is a digital signal. In examples where the transmitter system is a LIDAR, RADAR, or other sensor array, the transmit signal represents outputs generated by one or more sensors at the sensor array.

At operation 404, the transmitter of the rotary data coupler is rotated relative to the receiver of the rotary data coupler. This may include rotating the transmitter while keeping the receiver stationary, rotating the receiver while keeping the transmitter stationary, and/or rotating both the receiver and the transmitter. Rotation of the transmitter relative to the receiver may be performed while the transmit signal is being generated at operation 402. For example, a sensor array may generate data while it is rotated.

At operation 406, the transmitter transmits the transmit signal across the rotating rotary data coupler. For example, the transmitter provides a current and/or voltage representing the transmit signal across the transmit bands (e.g., 106A, 106B) of the rotary data coupler. At operation 408, the receiver receives a received signal that, as described herein, may appear across the receive bands (e.g., 108A, 108B) of the rotary data coupler. For example, the transmit signal causes a current through and/or voltage across the receiver resistance (e.g., 114) that indicates the transmit signal. The differential amplifier redrives that current and/or voltage, as described herein, to generate the received signal at an output of the differential amplifier.

Figure 5:
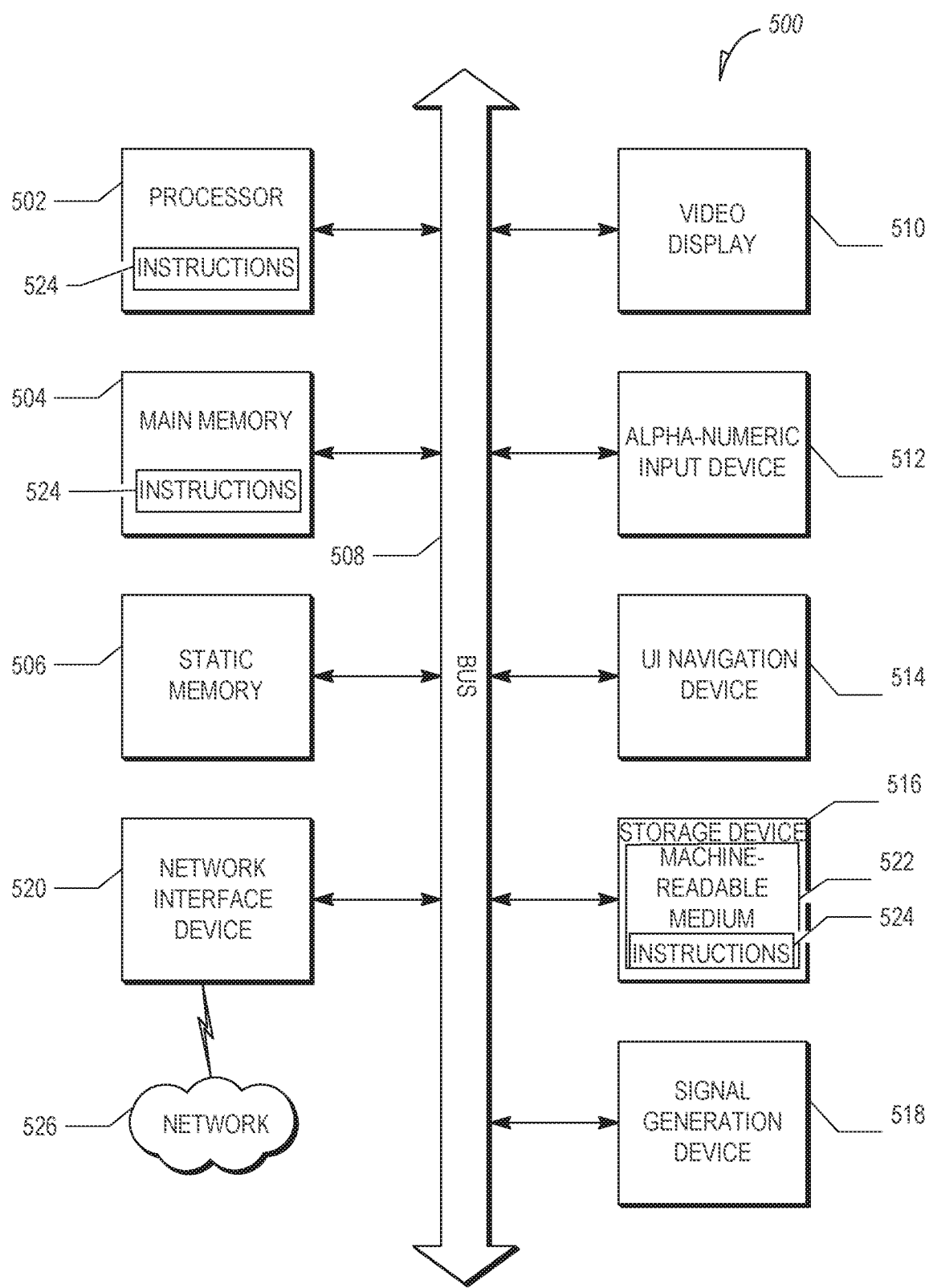
FIG. 5 is a block diagram illustrating a computing device hardware architecture, within which a set or sequence of instructions can be executed to cause a machine to perform examples of any one of the methodologies discussed herein.

FIG. 5 is a block diagram illustrating a computing device hardware architecture 500, within which a set or sequence of instructions can be executed to cause a machine to perform examples of any one of the methodologies discussed herein. The architecture 500 may describe, for example, a transmitter system, such as the transmitter system 110 of FIG. 1, a receiver system, such as the receiver system 120 of FIG. 1. In some examples, the architecture 500 may also describe all or part of the sensor system 357, the perception system 354, the control system 356, etc.

The architecture 500 may operate as a standalone device or may be connected (e.g., networked) to other machines. In a networked deployment, the architecture 500 may operate in the capacity of either a server or a client machine in server-client network environments, or it may act as a peer machine in peer-to-peer (or distributed) network environments. The architecture 500 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 500 includes a processor unit 502 comprising at least one processor (e.g., a central processing unit (CPU), a graphics processing unit (GPU), or both, processor cores, compute nodes, etc.). The architecture 500 may further comprise a main memory 504 and a static memory 506, which communicate with each other via a link 508 (e.g., bus). The architecture 500 can further include a video display unit 510, an input device 512 (e.g., a keyboard), and a UI navigation device 514 (e.g., a mouse). In some examples, the video display unit 510, input device 512, and UI navigation device 514 are incorporated into a touch-screen display. The architecture 500 may additionally include a storage device 516 (e.g., a drive unit), a signal generation device 518 (e.g., a speaker), a network interface device 520, and one or more sensors (not shown), such as a Global Positioning System (GPS) sensor, compass, accelerometer, or other sensor.

In some examples, the processor unit 502 or another suitable hardware component may support a hardware interrupt. In response to a hardware interrupt, the processor unit 502 may pause its processing and execute an ISR, for example, as described herein.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, within the static memory 506, and/or within the processor unit 502 during execution thereof by the architecture 500, with the main memory 504, the static memory 506, and the processor unit 502 also constituting machine-readable media.

Executable Instructions and Machine-Storage Medium

The various memories (i.e., 504, 506, and/or memory of the processor unit(s) 502) and/or storage device 516 may store one or more sets of instructions and data structures (e.g., instructions) 524 embodying or utilized by any one or more of the methodologies or functions described herein. These instructions, when executed by processor unit(s) 502 cause various operations to implement the disclosed examples.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 can further be transmitted or received over a communications network 526 using a transmission medium via the network interface device 520 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A rotary data coupler comprising:
   a rotatable cylinder comprising a cylindrical cavity in a center of the rotatable cylinder;
   a transmitter located on and coupled to the rotatable cylinder;
   two or more first bands attached to an inside surface of the cylindrical cavity of the rotatable cylinder;
   a cylinder positioned inside the cylindrical cavity;
   a receiver located on and coupled to the cylinder;
   two or more second bands attached to an outer surface of the cylinder, wherein each of the two or more first bands is aligned with a corresponding one of the two or more second bands; and
   two or more capacitors formed across a gap between each pair of aligned bands, wherein the two or more capacitors form two or more capacitive couplings that couple the transmitter to the receiver for transmitting a differential signal.

2. The rotary data coupler of claim 1, further comprising a line transmission terminator, wherein the line transmission terminator reduces or eliminates reflection of the transmitted signal.

3. The rotary data coupler of claim 1, further comprising a differential receiver resistance, wherein the differential receiver resistance is configured between the two or more second bands.

4. The rotary data coupler of claim 1, further comprising a differential amplifier comprising an inverting input and a non-inverting input, the non-inverting input being electrically coupled to one of the two or more capacitive couplings and the inverting input being electrically coupled to the other of the two or more capacitive couplings.

5. The rotary data coupler of claim 1, further comprising a LIDAR system comprising the transmitter and the receiver.

6. The rotary data coupler of claim 1, wherein one or more characteristics of the differential signal are changed to encode information.

7. The rotary data coupler of claim 1, wherein the transmitted signal is encoded according to an encoding scheme that maintains a minimum number of transitions per unit time to maintain the transmitted signal above a minimum threshold.

8. The rotary data coupler of claim 1, further comprising:
   two or more further capacitive couplings formed by two or more third bands attached to an inside surface of the cylindrical cavity of the rotatable cylinder; and
   two or more fourth bands attached to an outer surface of the cylinder, wherein each of the two or more third bands is aligned with a corresponding one of the two or more fourth bands; and
   a line transmission terminator between the two or more third bands, wherein the two or more capacitive couplings and the two or more further capacitive couplings are configured for bi-directional transmissions.

9. The rotary data coupler of claim 1, wherein the gap between each pair of the aligned bands is at least 1 millimeter.

10. The rotary data coupler of claim 1, wherein a passband of the rotary data coupler is configured with a low cut-off frequency and a high cut-off frequency that avoids attenuating transitions in the differential signal transmitted across the two or more capacitive couplings.

11. A light detection and ranging (LIDAR) system, comprising:
   a rotating sensor housing configured to rotate relative to a vehicle about a rotary data coupler;
   the rotary data coupler, wherein the rotary data coupler comprises:
      a rotatable cylinder comprising a cylindrical cavity in a center of the rotatable cylinder;
      a transmitter located on and coupled to the rotatable cylinder;
      two or more first bands attached to an inside surface of the cylindrical cavity of the rotatable cylinder;

a cylinder positioned inside the cylindrical cavity;
a receiver located on and coupled to the cylinder;
two or more second bands attached to an outer surface of the cylinder, wherein each of the two or more first bands is aligned with a corresponding one of the two or more second bands;
two or more capacitors formed across a gap between each pair of aligned bands, wherein the two or more capacitors form two or more capacitive couplings that couple the transmitter to the receiver for transmitting a differential signal.

12. The LIDAR system of claim 11, wherein the rotating sensor housing comprises a sensor system having one or more LIDAR sensors.

13. The LIDAR system of claim 11, wherein outputs of the sensor system are provided to a perception system via the rotary data coupler.

14. The LIDAR system of claim 11, further comprising a first channel for transmitting data from the sensor system to the perception system and a second channel for transmitting data from the perception system to the sensor system.

15. The LIDAR system of claim 11, further comprising a line transmission terminator, wherein the line transmission terminator reduces or eliminates reflection of the transmitted signal.

16. The LIDAR system of claim 11, further comprising a differential receiver resistance, wherein the differential receiver resistance is configured between the two or more second bands.

17. The LIDAR system of claim 11, wherein one or more characteristics of the differential signal are changed to encode information.

18. The LIDAR system of claim 11, wherein the gap between each pair of the aligned bands is at least 1 millimeter.

19. The LIDAR system of claim 11, wherein a passband of the rotary data coupler is configured with a low cut-off frequency and a high cut-off frequency that avoids attenuating transitions in the differential signal transmitted across the two or more capacitive couplings.

20. A method of operating a rotary data coupler, the rotary data coupler having a rotatable cylinder comprising a cylindrical cavity in a center of the rotatable cylinder, a transmitter located on and coupled to the rotatable cylinder, and two or more first bands attached to an inside surface of the cylindrical cavity of the rotatable cylinder and further comprising a cylinder positioned inside the cylindrical cavity having a receiver located on and coupled to the cylinder and two or more second bands attached to an outer surface of the cylinder, wherein each of the two or more first bands is aligned with a corresponding one of the two or more second bands, and further wherein two or more capacitors formed across a gap between each pair of aligned bands form two or more capacitive couplings that couple the transmitter to the receiver for transmitting a differential signal, the method comprising:
rotating the transmitter relative to the receiver;
providing the differential signal at the two or more first bands while the transmitter is rotating relative to the receiver; and
receiving the differential signal at the two or more second bands while the transmitter is rotating relative to the receiver.

* * * * *